Nov. 10, 1959   P. N. SMITH   2,911,835
TRAVERSING ARRANGEMENT
Filed July 5, 1956   3 Sheets-Sheet 1
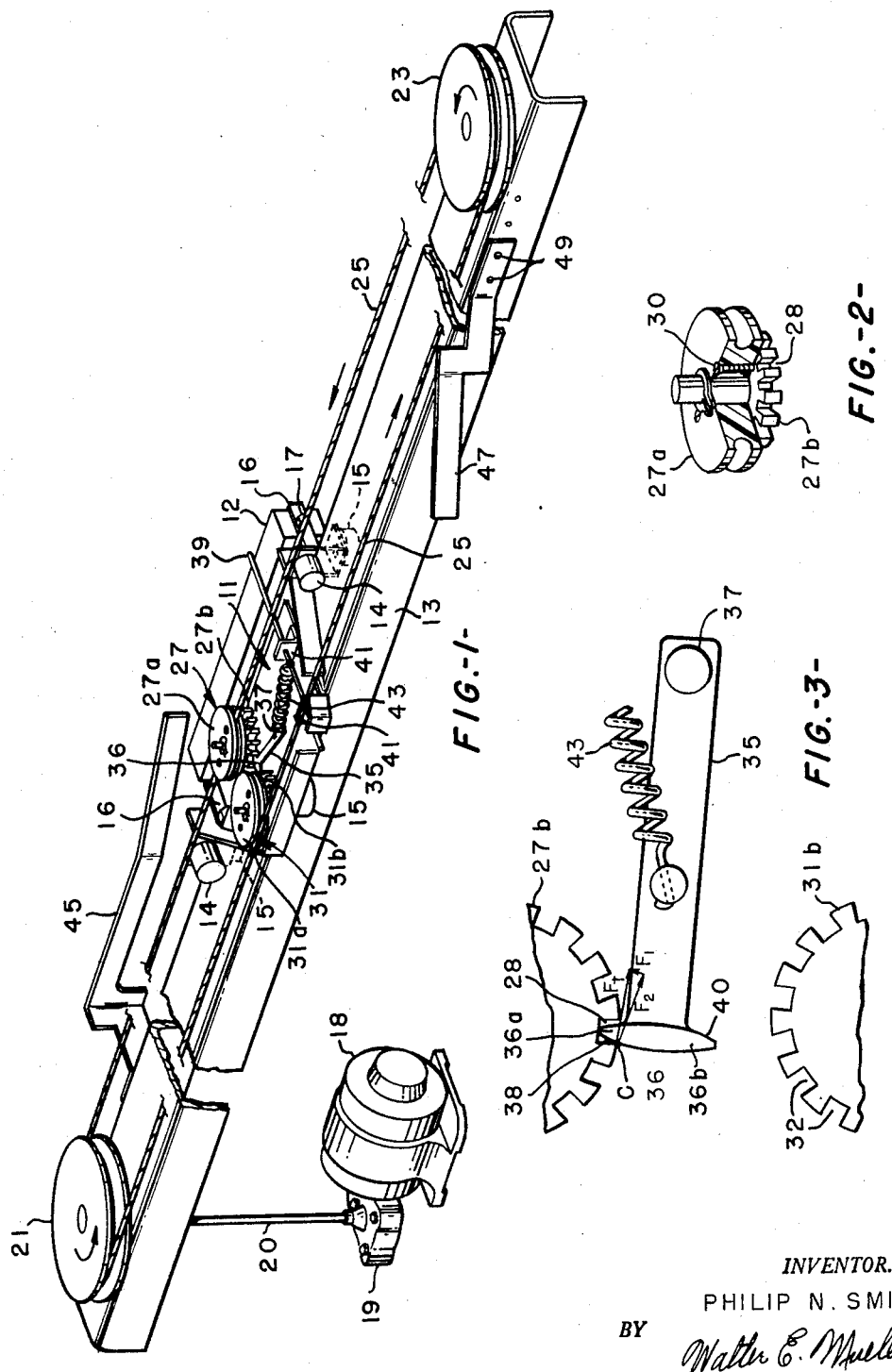
INVENTOR.
PHILIP N. SMITH
BY *Walter E. Mueller*
ATTORNEY Nov. 10, 1959     P. N. SMITH     2,911,835
TRAVERSING ARRANGEMENT
Filed July 5, 1956     3 Sheets-Sheet 2
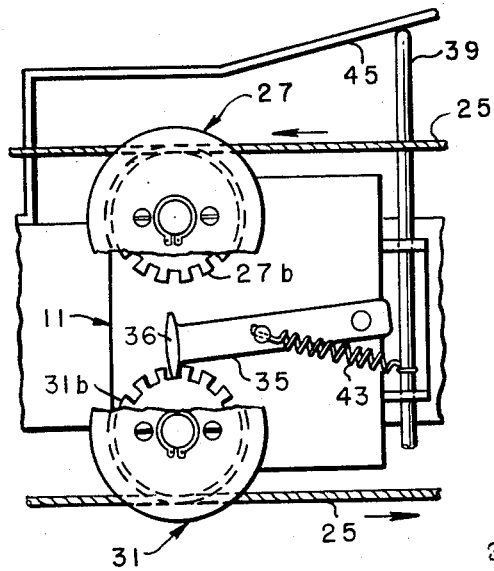
FIG.-4-
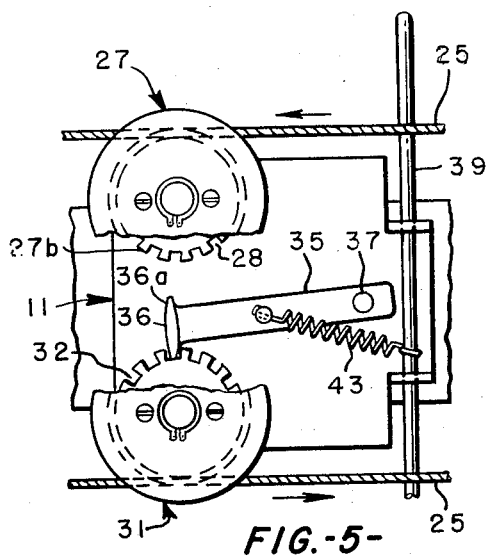
FIG.-5-
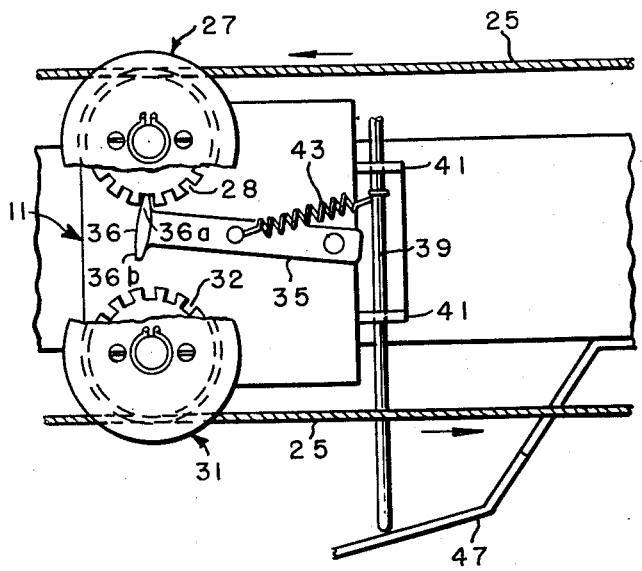
FIG.-6-
INVENTOR.
PHILIP N. SMITH
BY
ATTORNEY

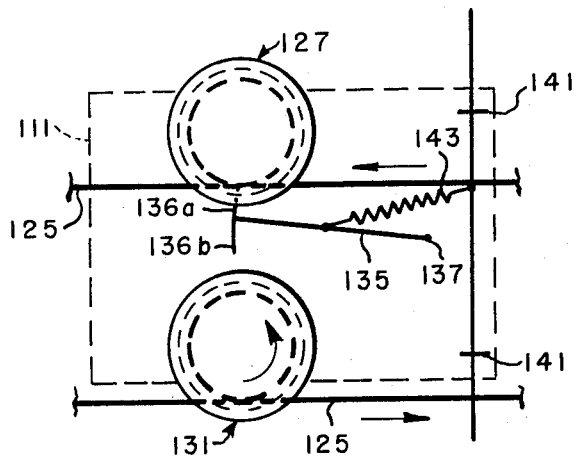
FIG.-7-
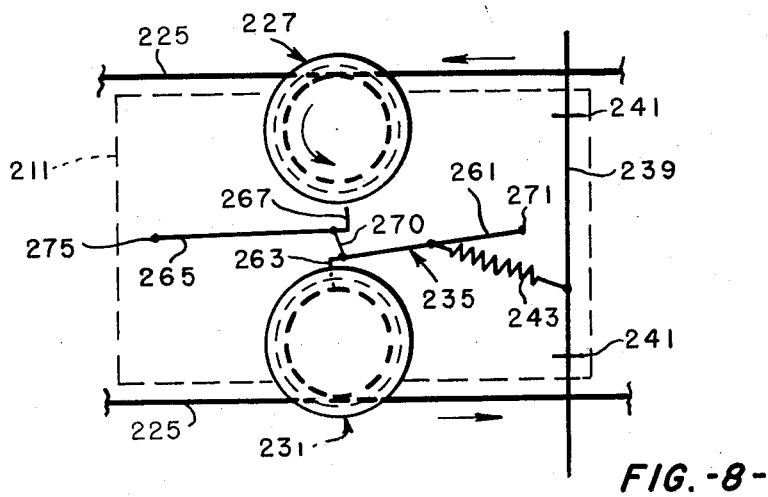
FIG.-8-
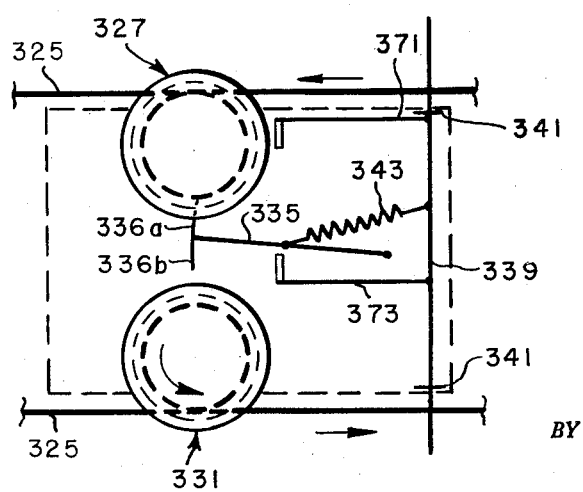
FIG.-9-
INVENTOR.
PHILIP N. SMITH
BY *Walter E. Mueller*
ATTORNEY.

United States Patent Office 2,911,835
Patented Nov. 10, 1959

2,911,835

TRAVERSING ARRANGEMENT

Philip N. Smith, Clemson, S.C., assignor to Deering Milliken Research Corporation, Pendleton, S.C., a corporation of Delaware Application July 5, 1956, Serial No. 596,062

21 Claims. (Cl. 74—37)

This invention relates to traversing arrangements, and more particularly to an improved self-reversible traversing arrangement.

Self-reversing carriage arrangements which are operated from a continuously driven endless cable, chain, or the like, by means which automatically clutch the carriage to alternately one and then the other run or reach of the cable or chain have been known in the prior art for a number of years. Among these arrangements are the well known Scotch-yoke type, and a type wherein a clutch arrangement is carried by the reciprocated carriage and is made to alternately directly grip and release oppositely running reaches of a cable or to positively engage and release oppositely running reaches of a chain. The Scotch-yoke type is unsatisfactory in many instances, particularly due to the dwell at the end of each half of the traverse cycle. On the other hand, the carriage-carried clutch type in which the cable or chain is directly gripped or engaged and released gives a fast reversal action, but does so at the expense of causing considerable vibration and wear in the various parts at each reversal, particularly in the case of a positively engaged and disengaged chain, due to the necessity of quickly and directly absorbing the carriage kinetic energy. Also, in the case of a directly gripping clutch acting on a cable, the sudden engagement of the clutch member directly with the oppositely moving cable results in a high degree of frictional wear and sudden shear forces being exerted on the cable.

It is accordingly a principal object of this invention to provide a reversible carriage arrangement which gives a quick but relatively smooth carriage reversal action, and with a relatively small amount of wear on the driving member.

Another object of this invention is to provide an improved reversible traversing carriage arrangement operating on the carriage-clutched-to-cable principle, which gives a quick reversal at the end of each stroke but which does not employ a clutch member which directly engages and disengages the cable or other flexible drive member.

A further object is the provision of a self-reversible carriage arrangement operating on the principle of clutching the carriage alternately to oppositely traveling driving members, in which the carriage is alternately clutched to the respective driving members through the medium of alternately braking one and then the other of two intermediate rotatable members which are carried by the carriage and are in continuous engagement with the driving members.

Still other objects and many attendant advantages of the invention will become apparent to one skilled in the art upon reading the following description of several embodiments of the invention, taken in conjunction with the accompanying drawings, wherein:

Figure 1 is a perspective view of a preferred embodiment according to the invention.

Figure 2 is an enlarged view of one of the capstans carried by the carriage of Figure 1.

Figure 3 is a schematic view illustrating the seated engagement of the pivoted brake member of Figure 1 with one of the capstan ratchet wheels.

Figures 4, 5 and 6 are schematic views illustrating the reversing and traversing action of the embodiment of Figure 1.

Figures 7, 8 and 9 are schematic views illustrating three modified arrangements according to the invention.

Briefly, in a preferred embodiment of the invention a carriage is reciprocated through the medium of a continuously driven endless cable, each of the two reaches of which tractively engages a respective one of two rotatable capstans carried by the carriage. A brake unit, preferably of the snap-action positively engageable type, is carried by the carriage and is arranged to brake alternately one and then the other of the two capstans to effect travel of the carriage with first one reach of the cable and then with the other oppositely traveling reach. The brake reversing action is effected through the medium of reversing cams adjustably positioned at spaced apart intervals along the path of the carriage, and which are engaged by a brake-actuating member carried by the carriage to effect the brake-reversing action.

Referring now to the figures of the drawings, in Figure 1 a traversing carriage 11 is mounted for linear reciprocating movement on a guide-support bar 13, as through the medium of a pair of supporting rollers 14 having their axes parallel and horizontal, and three guide rollers 15 having their axes parallel and vertical and in guiding engagement with the vertically parallel sides of bar 13. It will be apparent that the carriage might also be slidably or otherwise mounted for reciprocation if desired, although the preferred and most advantageous arrangement is found in the use of a roller mounting. The frame of carriage 11 may have any suitable configuration, as may be desired, and may support an instrument 12, if desired, as through the medium of brackets 16 and securing screws 17.

Carriage 11 is reciprocated along the bar 13 through the medium of a drive motor 18, connected as through a variable speed drive unit 19 and shaft 20 to a drive pulley 21 secured onto shaft 20 and disposed at or near the end of bar 13. An idler pulley 23 is rotatably mounted at the opposite end of the bar 13. The pulleys 21 and 23 are interconnected by an endless flexible member which is preferably a cable 25 made of nylon, hemp or other suitable material. This invention is most advantageous in employing a cable or other similar flexible member which obtains tractive driving action through a friction connection rather than through positive connection as is the case with chain and sprocket drives, and which flexible member requires no lubrication thereof for proper functioning. This latter advantage of cables (particularly non-metallic cables) over chains in being operable without need for cable lubrication is of considerable utility in certain applications of the invention, particularly those wherein an instrument 12 such as a scanning head is being traversed across a textile fabric to detect defects, it being apparent that a system requiring lubrication of the driving element 25 would not be satisfactory due to the likelihood of the lubricant falling onto or being thrown onto the fabric during operation.

Carriage 11 has mounted thereon a pair of laterally spaced apart rotatable capstans 27 and 31 (preferably employing low friction bearing mounts), each of which has a grooved pulley section 27a and 31a respectively, and a gear or ratchet wheel section 27b and 31b respectively. The two sections of each capstan may be either secured together as through a common shaft fixed to each, or by means of screws, or may be formed integrally as a unit, as may be desired. Preferably the grooved pulley section and the ratchet wheel section are separately formed for ease of construction, and are secured together as by screws. 30. The cable 25 is looped in frictional tractive wraparound engagement about the grooved periphery of each of the upper capstan sections 27a and 31a. If either of the capstans is held against rotation with the other capstan being free, and if cable 25 is driven in any one direction, the linear movement of cable 25 will result in traversing movement of carriage 11 in the direction of movement of the reach of the cable 25 which is in tractive engagement wtih the capstan being held against rotation, while the other capstan will merely rotate freely about its axis as the reach in engagement therewith moves thereover.

Thus, by alternating holding one and then the other of the two capstans 27 and 31 against rotation the carriage 11 may be made to travel back and forth along the guide-support bar 13. To this end, a brake is provided in the form of a T-shaped arm 35 pivotally mounted, as by a pin 37, on carriage 11 in intermediate relation between capstans 27 and 31. A positively acting snap or toggle action over-center control is provided for moving the cross-head free end 36 of arm 35 into positive engagement with the notches 28 of a selected or desired one of the capstans 27 and 31. This snap or toggle action control takes the form of an actuating push rod 39 slidably mounted in a pair of guides 41 on the carriage 11, and connected to the arm 35 through the medium of a tension spring 43. The spring 43 is connected to arm 35 at a point between the pivot point 37 and the cross-head free end 36 thereof, whereby movement of rod 39 to either side of its over-center positions will result in the brake arm 35 being quickly moved in toggle-like snap-action manner from one to the other of the ratchet wheels 27b and 31b of the capstans 27 and 31 to thereby positively brake the engaged capstan against rotation.

While such is not always critically necessary to operation of the illustrated system I have found it of considerable advantage to form the teeth in the gear or ratchet wheels 27b and 31b with their sides undercut so as to give more or less parallel-sided notches 28 and 32 for engagement by the respective opposite cross-head fingers 36a and 36b (see Figures 3–6) of the brake arm 35. This configuration of the notches 28 and 32 is advantageous in providing adequate retaining action between the notches and the cross-head fingers 36a and 36b, respectively.

In order to provide for ease of engagement with and disengagement from the notches 28 and 32 it is desirable to form the respective fingers 36a and 36b of the brake arm somewhat in the manner illustrated in Figure 3. Assuming the cable 25 to be driven in the direction shown by the arrows, it is of particular advantage to form the outer engaging or thrust bearing surface 38 of the finger 36a seated within notch 28 with a radius of curvature decreasing from that at the thrust contact point C when fully seated. This is desirable in order to provide for ease of disengagement of the finger 36a from the notch 28. However, in utilizing this design concept it is important that the curvature of the outer surface 38 be such that if the vector component forces $F_1$ and $F_2$ of the force $F_t$ exerted thereon by wheel 27b result in an effective resultant torque moment tending to bias the brake arm 35 counterclockwise, this resultant counterclockwise torque should be of a magnitude less than the magnitude of the "dogging" or retaining torque exerted on the brake arm by the spring 43, in order not to prevent the seating and retention of the finger 36a in the notch 38 during the period when actuating rod 39 is slidably disposed toward the side of the carriage having the capstan 27 mounted thereon. Due to the fact that the thrust receiving surface 40 of finger 36b is on the side toward the pivot point, and has a radially outward vector movement during pivotal disengaging action thereof, disengagement of the finger 36b from the ratchet wheel 31b entails less difficulty than disengagement of finger 36a from ratchet wheel 27b. However, substantially the same observations may be applied generally with respect to the finger 36b as to finger 36a, except to note that the thrust receiving surface 40 thereof is the radially inner surface rather than the radially outer surface and the vector forces during seated contact of the finger 36b in notch 32 should not be such as to exert a material clockwise disengaging moment on arm 35 sufficient to overcome the engaging and retaining action of spring 43.

In order to provide a self-actuating reversing action of the carriage 11 through the movement of actuating rod 39 there is provided a pair of brake reversing members in the form of reversing cams 45 and 47. These reversing cams may preferably take the form of inclined planer surfaces formed by suitable sheet material and mounted on opposite sides of the bar 13, being either adjustably or fixedly mounted as may be desired, as by securing screws and nuts 49. Each of the cams 45 and 47 is disposed with its inclined plane cam surface in the respective extended-position path of actuating rod 39.

Thus, as viewed in Figure 1, with the cable 25 being driven in the direction of the arrows the carriage 11 will be traversed to the left since brake arm 35 is in locked braking engagement with the ratchet wheel of capstan 27. Push rod 39 is during this period disposed in its laterally extended position such that it will pass into engagement with cam 45 at the left end of the carriage travel, whereupon the actuating rod 39 will be moved, by engagement with cam 45 and continued linear movement of the carriage to the left, past the over-center position such that arm 35 will snap out of engagement with the ratchet wheel section 27b of capstan 27 and into engagement with the ratchet wheel section 31b of capstan 31, as illustrated schematically in Figure 4. The carriage will then quickly reverse its direction of travel and proceed toward the right, as shown schematically in Figure 5, until actuating rod 39 engages cam 47, whereupon the actuating rod will again be actuated, through the continued traversing movement thereof relative to cam 47, to move the arm quickly out of engagement with capstan 31 and into engagement with capstan 27, as seen in Figure 6. The movement of carriage 11 is thereby again reversed, and the carriage will again follow the path toward pulley 21 and cam 45. This cycle of operation will continue so long as the cable 25 is driven.

It is of note that for most embodiments employing a cable or other flexible drive member of the friction-gripping type the shock of each reversing action will be absorbed to a more or less considerable degree (dependent upon cable-to-capstan and cable-to-pulley coefficients of friction and tightness of the cable) by the momentary slippage of the cable on the braked capstan and the pulleys 23 upon the initiation of braking action on each capstan. This smoothing of the reversal action does not materially interfere with the quick reversal of the carriage, and is another important advantage of the particular preferred embodiment of this invention utilizing a friction-gripping type flexible drive member, such as a cable.

A modified arrangement is illustrated schematically in Figure 7, wherein the cable 125 is tractively wrapped around the capstans 127 and 131 of carriage 111 so as to drive the two capstans in opposite directions when they are free to rotate. With this arrangement, and with the cable 125 being driven in the direction of the arrows, the thrust contact surface on each of the fingers 136a and 136b will be on the radially inner side thereof toward the brake arm pivot point 137. Thus, the advantage of ease of disenagement, as discussed in connection with the arrangement of Figure 1, is attained for both of the fingers 136a and 136b.

In Figure 8 another modification is schematically illustrated, in which both capstans of the carriage 211 turn in the same direction when free, as in Figure 1, but utilizing a toggle-connected multi-member brake unit 235. The brake unit 235 comprises a pair of L-shaped arms 261 and 265 pivotally mounted in symmetrical relation on carriage 211 at spaced apart points 271 and 275 on opposite sides of a center line extending through the axes of capstans 227 and 231. The arms 261 and 265 have finger portions 263 and 267 respectively which extend in opposite directions away from each other and toward their respective adjacent capstans 227 and 231. Arms 261 and 265 are toggle-connected at their free ends by a link 270, and thus move as a unit. Arm 261 is connected to actuating rod 239 through the medium of a spring 243 to thereby provide a similar snap-action over-center control for the interconnected arms 261 and 265. The fingers 263 and 267 are of a length relative to the distance between capstans 227 and 231 as to provide engagement thereby of only one of the capstans at a time, and thus function to brake alternately one and then the other of the capstans similarly to the preceding described embodiments.

The embodiment of Figure 8 has a similar advantage to that of Figure 7 in that the thrust receiving surfaces of each of the fingers 263 and 267 are on the radially inner side thereof toward their respective pivot points. This advantage, as heretofore stated, lies particularly in the case of disengagement of the fingers from their notches during reversal action.

A further alternative modification for the solution of the sometimes encountered problem of difficulty of disengagement of the brake unit fingers is illustrated schematically in Figure 9, where a pair of positively acting cam release fingers 371 and 373 are formed on or secured to the push rod 339, which rides in supports 341. These fingers come into play to engage the brake arm 335 and thus to positively disengage the respective brake unit fingers 336a and 336b from the ratchet wheel sections of the capstans 327 and 331 in the event that the action of the spring 343 alone is not sufficient for one reason or another to initiate the disengaging action. Otherwise the action is the same as in Figure 1, and the spring 343 in any event completes the snap action after disengagement of or initiation of disengagement of the brake finger.

While it is obviously most advantageous to employ a single endless drive member (25, 125, 225) continuously driven in one direction during operation as illustrated herein, it is also feasible to employ this invention in connection with a pair of spaced apart separately driven members, such as provided by two endless members driven in the same direction and spaced laterally from one another so as to form by the adjacent reaches or runs thereof two oppositely traveling drive members for tractive engagement with the capstans of the carriage.

Other modifications within the scope and spirit of the invention will become readily apparent to one skilled in the art, and it is therefore to be understood that the invention is not to be limited by the specific illustrative embodiments but only by the scope of the appended claims.

I claim:

1. A traversing arrangement comprising a flexible endless member, means supporting said member at spaced apart points to form two opposing runs of said member, a movable carriage, support means for said carriage and extending along said runs, a pair of rotatable members mounted on said carriage and being in continuous tractive engagement each with a respective one of said runs, means for driving said endless member continuously in one direction, and a toggle-acting over-center brake adapted to selectively brake either of said rotatable members while the other is free to rotate.

2. A traversing arrangement according to claim 1 wherein said brake comprises an over-center toggle-acting pivoted unit selectively engageable with said rotatable members.

3. A traversing arrangement according to claim 1 wherein said brake comprises an over-center toggle acting pivoted unit selectively engageable with said rotatable members, and a spring operatively connected to said pivoted unit and adapted to bias said unit into engagement selectively with either of said rotatable members.

4. A traversing arrangement according to claim 3 further comprising a slidable actuating member movable relative to said pivoted unit, said spring being operatively connected between said slidable actuating member and said pivoted unit.

5. A traversing arrangement according to claim 4 wherein said actuating member is mounted for rectilinear motion transverse to the direction of traversing movement of said carriage.

6. A traversing arrangement comprising a flexible endless member, means supporting said member at spaced apart points to form two opposing runs of said member, a movable carriage, support means for said carriage and extending along said runs, a pair of rotatable members mounted on said carriage and being in continuous tractive engagement each with a respective one of said runs, means for driving said endless member continuously in one direction, and brake means adapted to selectively brake either of said rotatable members while the other is free to rotate, said brake means comprising a pivoted unit selectively engageable with several rotatable members, each of said rotatable members comprising a capstan having a peripheral surface in tractive engagement with said endless member and a toothed peripheral surface, said pivoted unit being selectively engageable with the toothed peripheral surface of either of said capstans.

7. A traverse arrangement comprising a movable endless flexible member, means supporting said endless member and adapted to form said member into two spaced apart oppositely movable runs, a movable carriage having a pair of rollers supported thereon and in tractive engagement each with a respective one of said runs, and a positive locking non-slip brake adapted to selectively positively brake one of said rollers while the other roller is free.

8. A traverse arrangement comprising a movable endless flexible member, means supporting said endless member and adapted to form said member into two spaced apart oppositely movable runs, a movable carriage having a pair of rollers supported thereon and in tractive engagement each with a respective one of said runs, and a brake adapted to selectively brake one of said rollers while the other roller is free, said endless member being in wraparound relation on each of said rollers, each of said rollers having a peripheral toothed surface, and said brake means comprising at least one movable tooth engaging member.

9. A traverse arrangement comprising a movable endless flexible member, means supporting said endless member and adapted to form said member into two spaced apart oppositely movable runs, a movable carriage having a pair of rollers supported thereon and in tractive engagement each with a respective one of said runs, and a brake adapted to selectively brake one of said rollers while the other roller is free, said brake means comprising a dog member pivotally mounted on said carriage, said dog member having a pair of oppositely extending dogs thereon, each of said dogs being adapted to positively and separately engage the toothed peripheral surface of a respective one of said rollers.

10. A traverse arrangement according to claim 9 further comprising brake-reversing members adjustably disposed at spaced apart positions along the path of said carriage.

11. A traverse arrangement according to claim 10 wherein said reversing members are cam-shaped, said brake having an actuating rod operatively engageable with said cam-shaped reversing memebrs.

12. A traverse arrangement according to claim 11 wherein said actuating rod has a pair of cam fingers thereon and disposed on either side of said dog member for positive disengaging action thereon.

13. A traversing carriage arrangement comprising an elongated supporting bar, a pair of pulleys rotatably mounted in spaced apart relation along the longitudinal axis of said bar, an endless flexible cable supported on and between said pulleys and forming two spaced apart substantially parallel runs extending longitudinally of said bar, a carriage, supporting and guiding rollers on said carriage guidably supporting said carriage for longitudinal movement along said bar, a pair of capstans rotatably mounted on said carriage, said flexible strand having its runs each engaged in tractive wrap-around relation about a respective one of said capstans, a positive locking brake mounted on said carriage and adapted to positively brake in locked non-slip relation either of said capstans separately, and unidirectional drive means operatively connected to one of said pulleys for driving said cable in one direction whereby said runs are each driven in oppositely extending directions longitudinally of said bar.

14. A traversing carriage arrangement comprising an elongated supporting bar, a pair of pulleys rotatably mounted in spaced apart relation along the longitudinal axis of said bar, an endless flexible cable supported on and between said pulleys and forming two spaced apart substantially parallel runs extending longitudinally of said bar, a carriage, supporting and guiding rollers on said carriage guidably supporting said carriage for longituinal movement along said bar, a pair of capstans rotatably mounted on said carriage, said flexible strand having its runs each engaged in tractive wrap-around relation about a respective one of said capstans, a brake mounted on said carriage and adapted to brake either of said capstans separately, and unidirectional drive means operatively connected to one of said pulleys for driving said cable in one direction whereby said runs are each driven in oppositely extending directions longitudinally of said bar, each of said capstans having synchronously movable therewith a ratchet wheel having substantially parallel sided notches in its periphery, said brake comprising a member pivotally mounted on said carriage and having notch-engaging means adapted to engage the notches of either of said ratchet wheels.

15. A traversing carriage arrangement according to claim 14 wherein said pivotally mounted member is generally T-shaped, the cross-head end portions thereof being engageable each with a notch in a respective one of said ratchet wheels, said cable being disposed about each of said capstans with its approach and departure points on the side thereof away from the other capstan.

16. A traversing carriage arrangement according to claim 15 further comprising an actuating rod mounted on said carriage for lateral movement thereon, a toggle spring operatively connected between said actuating rod and said pivotally mounted member, the spring connection point on said pivotally mounted member being between the free end thereof and the pivot point, said actuating rod and spring being movable to direct the force of said spring to either of two opposite sides of the pivot point and thereby effect a toggle action on said pivotally mounted member.

17. A traversing carriage arrangement according to claim 16 wherein said actuating rod is slidable transversely of said carriage, and wherein there are further provided two longitudinally spaced apart cam members each disposed in the path of a respective end of said actuating rod during movement of said carriage toward said cam member.

18. A traversing arrangement comprising a pair of laterally space apart longitudinally extending runs of flexible material, drive means operatively connected to said runs and adapted to drive said runs each in an opposite longitudinal direction to the other, a carriage movable along a longitudinal path between said runs, two spaced apart capstans rotatably mounted on said carriage and in continuous tractive engagement each with a separate respective one of said runs, and a positive locking non-slip brake unit mounted on said carriage and selectively operatively connectable in positive locking engagement with either of said capstans to brake in non-slipping relation one capstan while the other is free and thereby effect a selected one of two opposite longitudinal directions of travel for said carriage.

19. A traversing arrangement comprising a pair of laterally spaced apart longitudinally extending runs of flexible material, drive means operatively connected to said runs and adapted to drive said runs each in an opposite longitudinal direction to the other, a carriage movable along a longitudinal path between said runs, two spaced apart capstans rotatably mounted on said carriage and in continuous tractive engagement each with a separate respective one of said runs, and a brake unit mounted on said carriage and selectively operatively connectable with either of said capstans to brake one capstan while the other is free and thereby effect a selected one of two opposite longitudinal directions of travel for said carriage, said each of said capstans having a ratchet wheel secured thereto, said brake unit comprising a T-shaped member movable into positive engagement with either of said ratchet wheels.

20. A traversing arrangement comprising a pair of laterally spaced apart longitudinally extending runs of flexible material, drive means operatively connected to said runs and adapted to drive said runs each in an opposite longitudinal direction to the other, a carriage movable along a longitudinal path between said runs, two spaced apart capstans rotatably mounted on said carriage and in continuous tractive engagement each with a separate respective one of said runs, and a brake unit mounted on said carriage and selectively operatively connectable with either of said capstans to brake one capstan while the other is free and thereby effect a selected one of two opposite longitudinal directions of travel for said carriage, said brake unit comprising two arms pivotally mounted in spaced apart relation intermediate of said capstans, and a toggle link connecting said arms together at their free end, said arms each having an engaging element for engaging a respective one of said capstans.

21. A traversing arrangement comprising a flexible endless member, means supporting said member at spaced apart points to form two opposing runs of said member, a movable carriage, support means for said carriage and extending along said runs, a pair of rotatable members mounted on said carriage and being in continuous tractive engagement each with a respective one of said runs, means for driving said endless member continuously in one direction, and brake means adapted to selectively brake either of said rotatable members while the other is free to rotate, each of said rotatable members comprising a capstan having a peripheral surface in tractive engagement with said endless member and having a toothed peripheral surface, said brake means comprising a pivoted arm selectively engageable with the toothed peripheral surface of either of said capstans.

References Cited in the file of this patent

UNITED STATES PATENTS

| | | |
|---|---|---|
| 520,828 | Koss | June 5, 1894 |
| 1,611,790 | Starr | Dec. 21, 1926 |
| 1,774,356 | Cloud | Aug. 26, 1930 |
| 2,462,060 | Bartelt | Feb. 22, 1949 |
| 2,474,755 | Pamphilom | June 28, 1949 |

FOREIGN PATENTS

| | | |
|---|---|---|
| 130,982 | Austria | Dec. 27, 1932 |
| 185,186 | Austria | Apr. 10, 1956 |
| 484,006 | Germany | Oct. 10, 1929 |